Oct. 27, 1959 R. TERLECKI ET AL 2,910,535

ELECTRIC CARRIER TELEGRAPH SYSTEMS

Filed June 13, 1955 2 Sheets-Sheet 1

INVENTORS
Renat Terlecki
Robert O. Carter
BY
Ralph B. Stewart
ATTORNEY

INVENTORS
Arnd Terlecki
Robert O. Carter
BY Ralph B. Stewart
ATTORNEY

United States Patent Office 2,910,535

Patented Oct. 27, 1959

2,910,535

ELECTRIC CARRIER TELEGRAPH SYSTEMS

Renat Terlecki, Taplow, and Robert Owen Carter, Woodford Green, England

Application June 13, 1955, Serial No. 515,207

Claims priority, application Great Britain June 15, 1954

6 Claims. (Cl. 178—50)

The present invention relates to electric carrier telegraph systems.

In a known frequency shift electric carrier telegraph system described on pages 20 to 33 of the journal entitled "Electrical Communication" published by the International Telephone and Telegraph Corporation, New York, U.S.A., volume 29, No. 1, March 1952, provision is made for transmitting telegraph signals from two sources by arranging that oscillations of four different frequencies are transmitted depending upon whether the signals to be transmitted from two sources simultaneously are (*i*) Mark Mark, (*ii*) Mark Space, (*iii*) Space Mark or (*iv*) Space Space respectively.

At a co-operating receiver each received oscillation is amplified and then heterodyned with an oscillation of fixed frequency such that audio-frequency beats are produced. These beats are amplified and separated into different paths by means of filters. The outputs of the filters are applied to rectifiers which in turn are appropriately connected to keying devices of the two channels respectively.

The use of a local oscillator has the disadvantage, however, that it determines to a substantial degree the minimum permissible spacing of the frequencies of the four transmitted oscillations. Thus unless relatively complex and costly equipment is provided to maintain the frequency of the local oscillator substantially constant the difference between the frequencies of the four oscillations cannot be made very close.

It is one object of the present invention to provide an improved two-channel telegraph transmitter whereby the aforesaid disadvantage can be overcome.

According to the present invention a two-channel, frequency-shift, telegraph transmitter is adapted to transmit two carrier oscillations of different frequencies simultaneously and to vary the difference between the frequencies of the transmitted oscillations to different values $F_1$, $F_2$, $F_3$ and $F_4$ depending upon whether the signals to be transmitted from two sources simultaneously are Mark Mark, Mark Space, Space Mark, or Space Space respectively. Thus the difference frequencies $F_1$, $F_2$, $F_3$ and $F_4$ may be made audio-frequencies and hence at a co-operating receiver no local oscillator is necessary to obtain the audio-frequency beats. Each received pair of oscillations is merely applied to a non-linear impedance element such as a rectifier device for the purpose of obtaining the audio-frequency beats. This may then be employed as described in the aforesaid journal to operate keying devices of the two channels respectively.

The invention will now be described by way of example with reference to the accompanying drawings in which.

Figure 1:
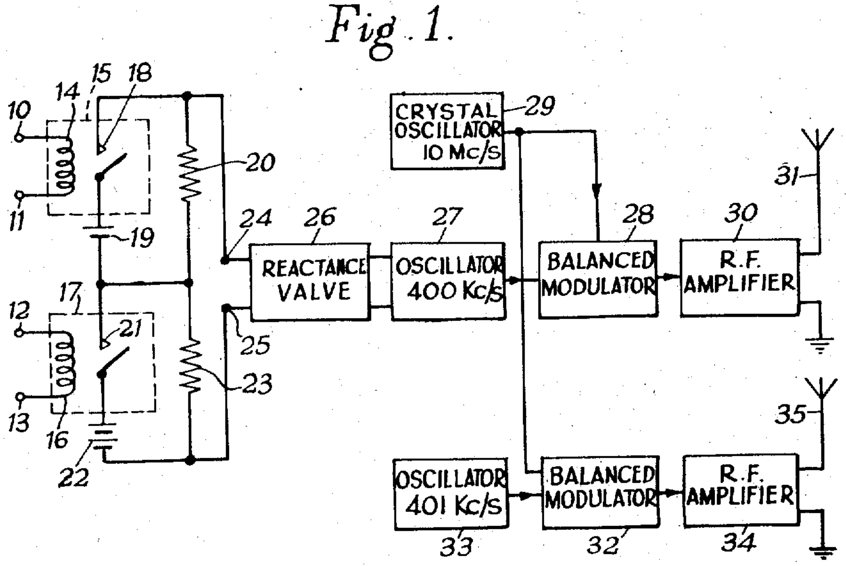
Figure 1 is a block schematic diagram of a transmitter.

In Figure 1 mark and space signals are applied from a first signal source (not shown) to terminals 10 and 11 and mark and space signals from a second signal source (not shown) are applied to terminals 12 and 13. The signals appearing at the terminals 10 and 11 are applied to the operating winding 14 of a relay 15 and the signals appearing at the terminals 12 and 13 are applied to the operating winding 16 of a relay 17. The contacts 18 of the relay 15 when closed connect a battery 19 across a resistor 20 and the contacts 21 of the relay 17 when closed connect a further battery 22 across a resistor 23. The resistors 20 and 23 are connected in series whereby the voltage appearing across the terminals 24 and 25 is dependent upon whether either or both of the relays 15 and 17 are energised. The batteries 19 and 22 are arranged to be of different voltages. Thus if the voltage of the battery 19 is $x$ volts and the voltage of the battery 22 is $2x$ volts, the voltage between the terminals 24 and 25 may be zero, $x$ volts, $2x$ volts, or $3x$ volts depending upon the energisation of the relays.

The voltages appearing between the terminals 24 and 25 are applied to a reactance valve 26 associated with an oscillator 27 of nominal frequency 400 kc./s. Thus the frequency of the oscillations generated by the oscillator 27 will be varied to four different values depending upon the energisation of the relays 15 and 17.

The output of the oscillator 27 is applied to a balanced modulator 28 together with the output of a crystal oscillator 29. One of the sidebands appearing in the output of the balanced modulator is selected by the R.F. amplifier 30, is amplified thereby and applied to an aerial 31 for transmission.

The output of the crystal oscillator 29 is applied to a further balanced modulator 32 together with an oscillation from an oscillator 33 of fixed frequency 401 kc./s. One of the sidebands appearing in the output of the balanced modulator 32 is selected by the amplifier 34, is amplified thereby and applied to an aerial 35 for transmission.

It is arranged that when the two signals applied to the terminals 10, 11 and 12, 13 are both mark signals the difference between the frequencies of the oscillations transmitted from the two aerials 31 and 35 is of a first predetermined value $F_1$; when the two signals are mark and space respectively the difference between the frequencies of the oscillations transmitted from the aerials 31 and 35 is of a second predetermined value $F_2$; when the signals are space and mark respectively the difference between the frequencies of the oscillations transmitted from the aerials 31 and 35 is of a third predetermined value $F_3$; and when the signals are space space the difference between the frequencies of the oscillations transmitted from the aerials 31 and 35 is of a fourth predetermined value $F_4$; the frequencies $F_1$ to $F_4$ all being audio-frequencies.

Figure 2:
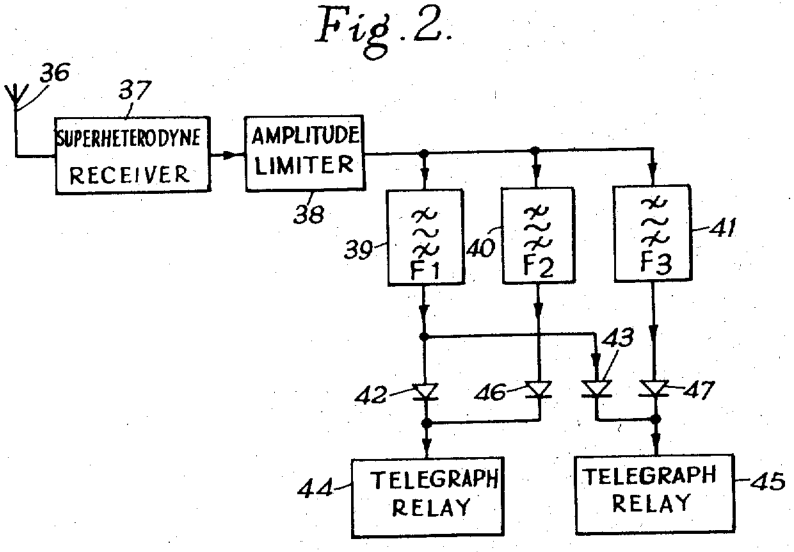
Figure 2 is a block schematic diagram of a receiver.

Referring now to Figure 2, this shows a receiver suitable for use with the transmitter of Figure 1. A receiving aerial 36 is connected to a conventional superheterodyne receiver 37. No local oscillator is however required before the second detector because the difference between the frequencies of each received pair of oscillations is of the required value $F_1$, $F_2$, $F_3$ or $F_4$ and hence beats of these frequencies appear in the output of the second detector. It will be appreciated that a superheterodyne receiver is not essential. Any suitable receiver may be employed.

The beats appear in the output of the receiver as audio-frequency tones and are applied through an amplitude limiter 38 to three band-pass filters 39, 40 and 41 which are adapted to pass oscillations of the frequencies $F_1$, $F_2$ and $F_3$ respectively each to the exclusion of the others.

The output of the filter 39 is connected through two rectifiers 42 and 43 to two telegraph relays 44 and 45 respectively. The output of the filter 40 is applied through a rectifier 46 to the relay 44 only and the output of the filter 41 is applied through a rectifier 47 to the relay 45 only.

Thus when a tone of the frequency $F_1$ appears in the output of the receiver 37 representing the signals mark mark in the two channels respectively both of the relays 44 and 45 are operated; when a tone of the frequency $F_2$ appears in the output of the receiver 37 representing the signals mark space in the two channels respectively the relay 44 is operated and the relay 45 is not; when a tone of the frequency $F_3$ appears in the output of the receiver 37 representing the signals space mark in the two channels respectively the relay 45 is operated and the relay 44 is not; and when a tone of the frequency $F_4$ appears in the output of the receiver neither of the relays 44 and 45 is operated. The transmission of the tone of frequency $F_4$ through the limiter 38 prevents noise from operating the relays 44 and 45. Thus the mark and space signals applied to the terminals 10, 11 and 12, 13 of Figure 1 are reproduced by the relays 44 and 45 of Figure 2.

Figure 3:
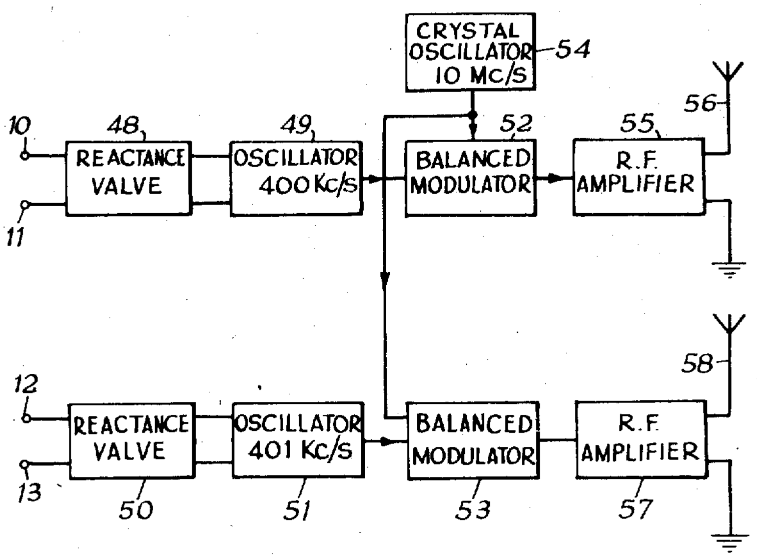
Figure 3 is a block schematic diagram of a further transmitter.

Referring now to Figure 3, this is a block schematic diagram of an alternative form of transmitter. The terminals 10 and 11 in this figure are connected to a reactance valve 48 associated with an oscillator 49 of nominal frequency 400 kc./s. The frequency of the oscillator is 400 kc./s. when no signal is applied to the terminals 10 and 11 corresponding to space and is arranged to be shifted by 50 c./s. on the application of a mark signal to the terminals 10 and 11.

Terminals 12 and 13 are connected to a further reactance valve 50 associated with a further oscillator 51 of nominal frequency 401 kc./s. The frequency of the oscillator 51 is arranged to be 401 kc./s. in the absence of a signal on the terminals 12 and 13 corresponding to space and to be shifted by 50 c./s. on the application of a mark signal to the terminals 12 and 13.

The outputs of the two oscillators 49 and 51 are applied to two balanced modulators 52 and 53 respectively where they modulate an oscillation from a crystal oscillator 54 of 10 mc./s. An R.F. amplifier 55 selects one sideband from the output of the modulator 52, amplifies it and applies it to an aerial 56 for transmission. An R.F. amplifier 57 selects one sideband from the output of the modulator 53, amplifies it and applies it to an aerial 58 for transmission.

Again it is arranged that if the two signals appear between the terminals 10, 11 and 12, 13 are mark mark respectively the difference between the frequencies of the transmitted oscillations in $F_1$; when the two signals are mark space respectively the difference between the frequencies of the transmitted oscillations is $F_2$; when the two signals are space mark respectively the difference between the frequencies of the transmitted oscillation is $F_3$; and when the two signals are space space respectively the difference between the frequencies of the transmitted oscillations is $F_4$. The receiver of Figure 2 is employed to receive the signals transmitted by the transmitter of Figure 3.

Although a receiver has been described with reference to Figure 2 in which filters 39, 40 and 41 are employed for the purpose of enabling the two channels to be separated it will be understood that the present invention enables a substantial reduction to be made in the separation of the frequencies employed whereby filters may not be convenient to use. In these circumstances frequency discriminators may be employed as will be understood by those skilled in the art.

In yet another arrangement of the transmitter not shown in the drawings two crystal oscillators may be provided one of the oscillators being connected to a keying circuit whereby the frequency of the oscillator can be varied or "pulled" in dependence upon the magnitude of a keying voltage. The keying voltage may, for example, be that appearing at the terminals 24 and 25 of Figure 1. The keying circuit is preferably as described in co-pending British patent application No. 16,454/55.

We claim:

1. A two-channel, frequency-shift, telegraph transmitter comprising two signal sources both comprising Mark and Space signals, means to generate and transmit simultaneously two carrier oscillations of different frequencies, and modulator means controlled by said signal sources and varying the frequency of at least one of said carrier oscillations to produce frequency-difference values between the frequencies of said two carrier oscillations of four different values $F_1$, $F_2$, $F_3$ and $F_4$ respectively in response to signal combinations of Mark-Mark, Mark-Space, Space-Mark and Space-Space respectively, the signals in each pair being generated by the said two signal sources respectively.

2. A telegraph transmitter according to claim 1, wherein said modulator means includes two relay devices controlled by said two signal sources, a circuit controlled by said relays and producing four different voltage conditions depending upon the signals applied to the two relays, means responsive to said four voltage conditions to establish the frequency of one of said carrier oscillations at four different values respectively, and means for transmitting the four oscillations together with a fifth oscillation which differs in frequency from the four oscillations by the values $F_1$, $F_2$, $F_3$ and $F_4$ respectively.

3. A telegraph transmitter according to claim 1, wherein said modulator means includes means controlled by one signal source for changing the frequency of one carrier oscillation generator and means controlled by the other signal source for changing the frequency of the second carrier oscillation generator, the arrangement being such that the transmitted pairs of oscillations differ in frequency by the values $F_1$, $F_2$, $F_3$ and $F_4$ depending upon the signals from the two signal sources.

4. A two-channel, frequency-shift, telegraph system comprising, two signal sources both comprising Mark and Space signals, means to generate simultaneously two carrier oscillations of different frequencies, modulator means controlled by said signal sources and varying the frequency of at least one of said carrier oscillations to produce frequency-difference values between the frequencies of said two carrier oscillations of four different values $F_1$, $F_2$, $F_3$ and $F_4$ respectively in response to signal combinations of Mark-Mark, Mark-Space, Space-Mark and Space-Space respectively, the signals in each pair being generated by the said two signal sources respectively, a receiver tuned to receive both said simultaneously transmitted carrier oscillations, said receiver including means to detect beat waves between said two carrier oscillations, a plurality of filters connected to said receiver, said filters being tuned to pass different ones of said beat waves, and telegraph receiving apparatus connected to said filters to reproduce the said Mark and Space signals of said two signal sources in separate circuits.

5. A two-channel telegraph system according to claim 4 in which said receiver includes three filters for passing beat waves of frequencies $F_1$, $F_2$ and $F_3$, and including a pair of rectifiers for supplying to one telegraph receiving circuit rectified waves of beat frequencies $F_1$ and $F_2$ and a second pair of rectifiers for supplying to the second telegraph receiving circuit rectified waves of beat frequencies $F_1$ and $F_3$.

6. A two-channel, frequency-shift telegraph transmitter comprising two signal sources both providing Mark and Space signals, means connecting said sources to provide a different predetermined output in response to signal combinations of Mark-Mark, Mark-Space, Space-Mark and Space-Space respectively, each signal in a pair being respectively generated by a signal source, means to generate and transmit simultaneously two carrier oscillations of different frequencies, and means responsive to said output for controlling at least one of said carrier oscillations to produce frequency differences between said two carrier oscillations of four different values $F_1$, $F_2$, $F_3$ and $F_4$ corresponding respectively to the said signal combinations.

References Cited in the file of this patent

UNITED STATES PATENTS

| | | |
|---|---|---|
| 1,669,448 | Brand | May 15, 1928 |
| 1,669,449 | Brand | May 15, 1928 |
| 1,669,450 | Brand | May 15, 1928 |
| 1,988,614 | Tuczek | Jan. 22, 1935 |
| 2,271,721 | Smith | Feb. 3, 1942 |
| 2,301,373 | Cox | Nov. 10, 1942 |
| 2,701,276 | Pletscher | Feb. 1, 1955 |